July 25, 1950  F. G. BROCKMAN  2,516,672
APPARATUS FOR MEASURING RADIANT ENERGY
Filed May 27, 1944  7 Sheets-Sheet 1
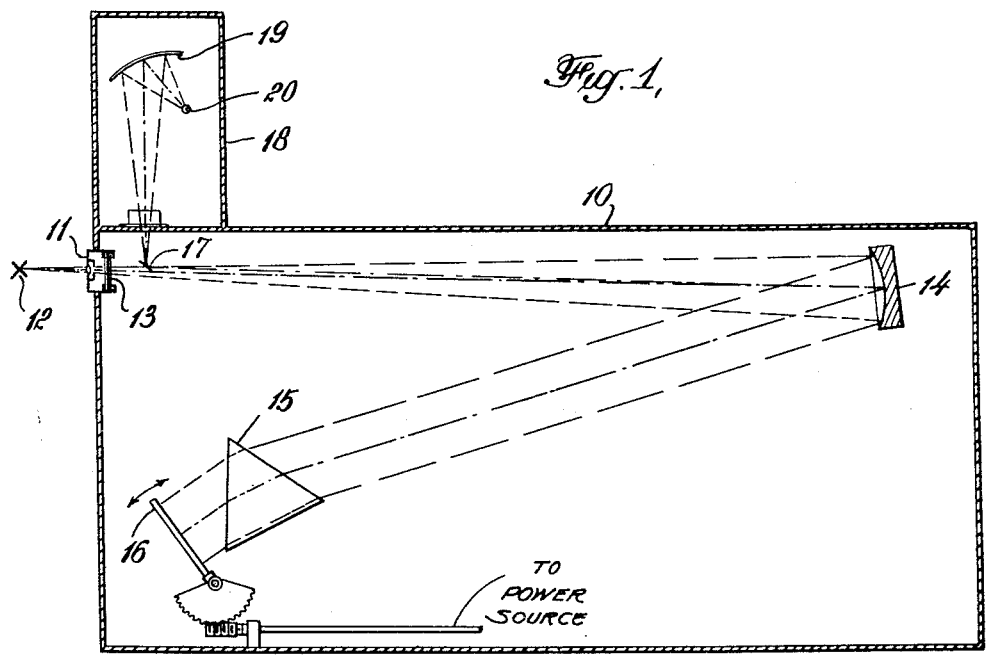
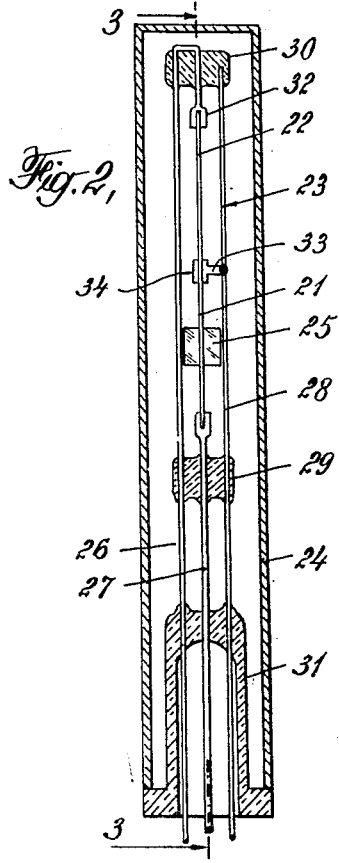
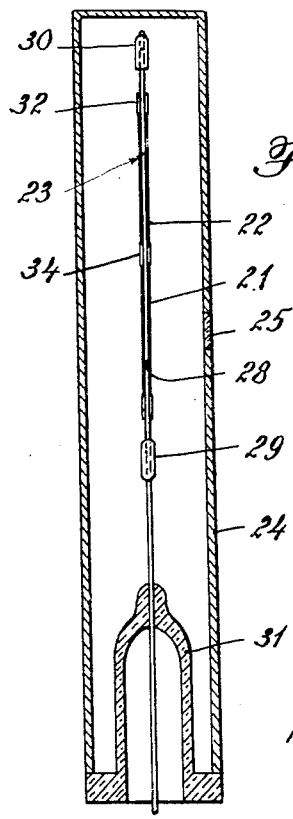
INVENTOR
Frank G. Brockman
BY James Y. Cleveland
ATTORNEY

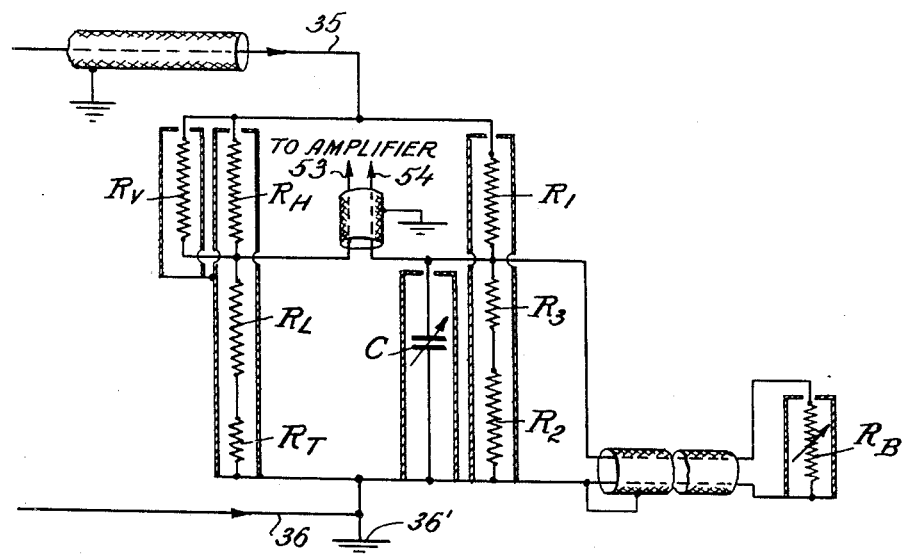
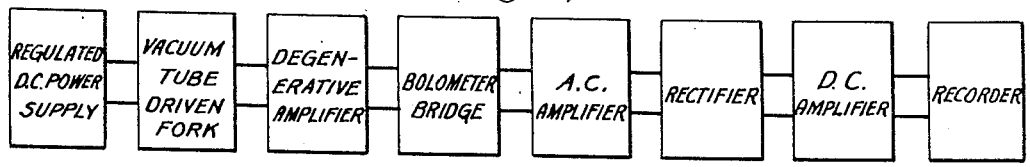
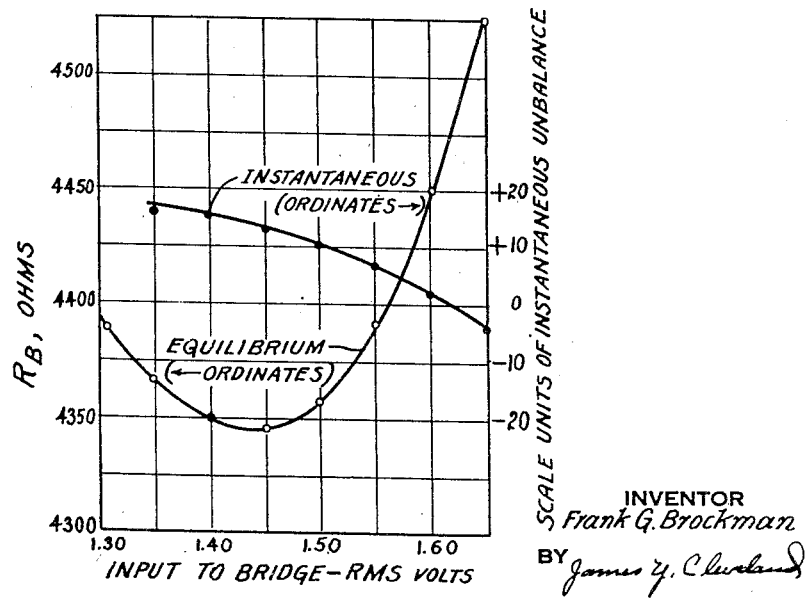

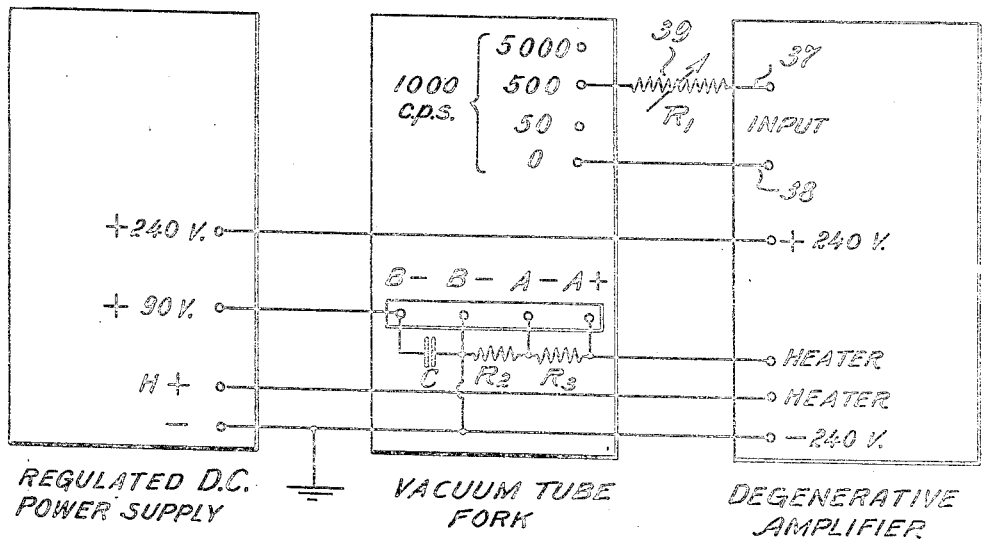
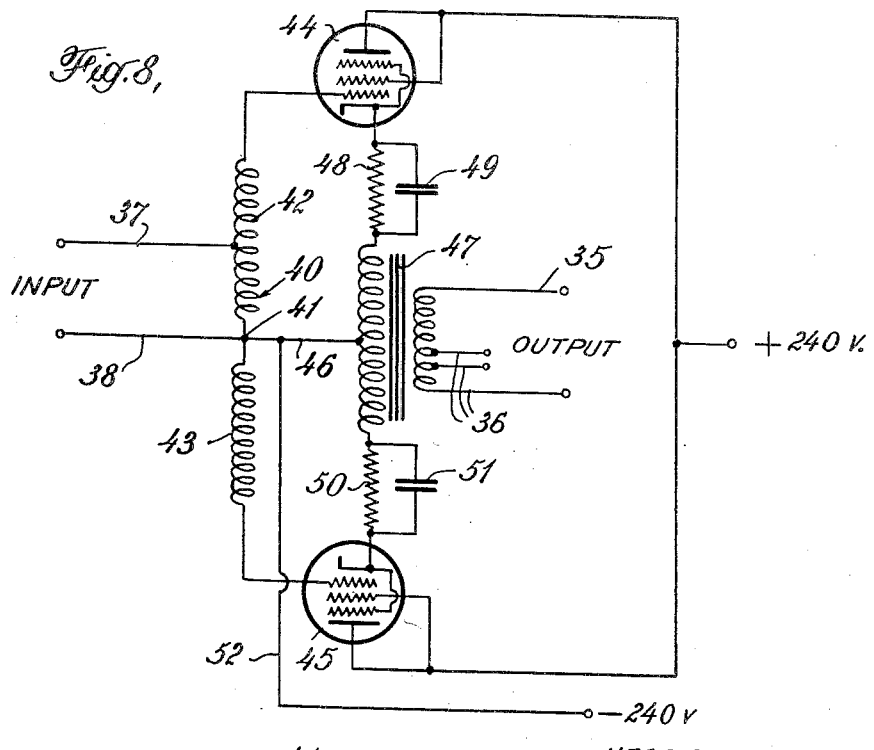

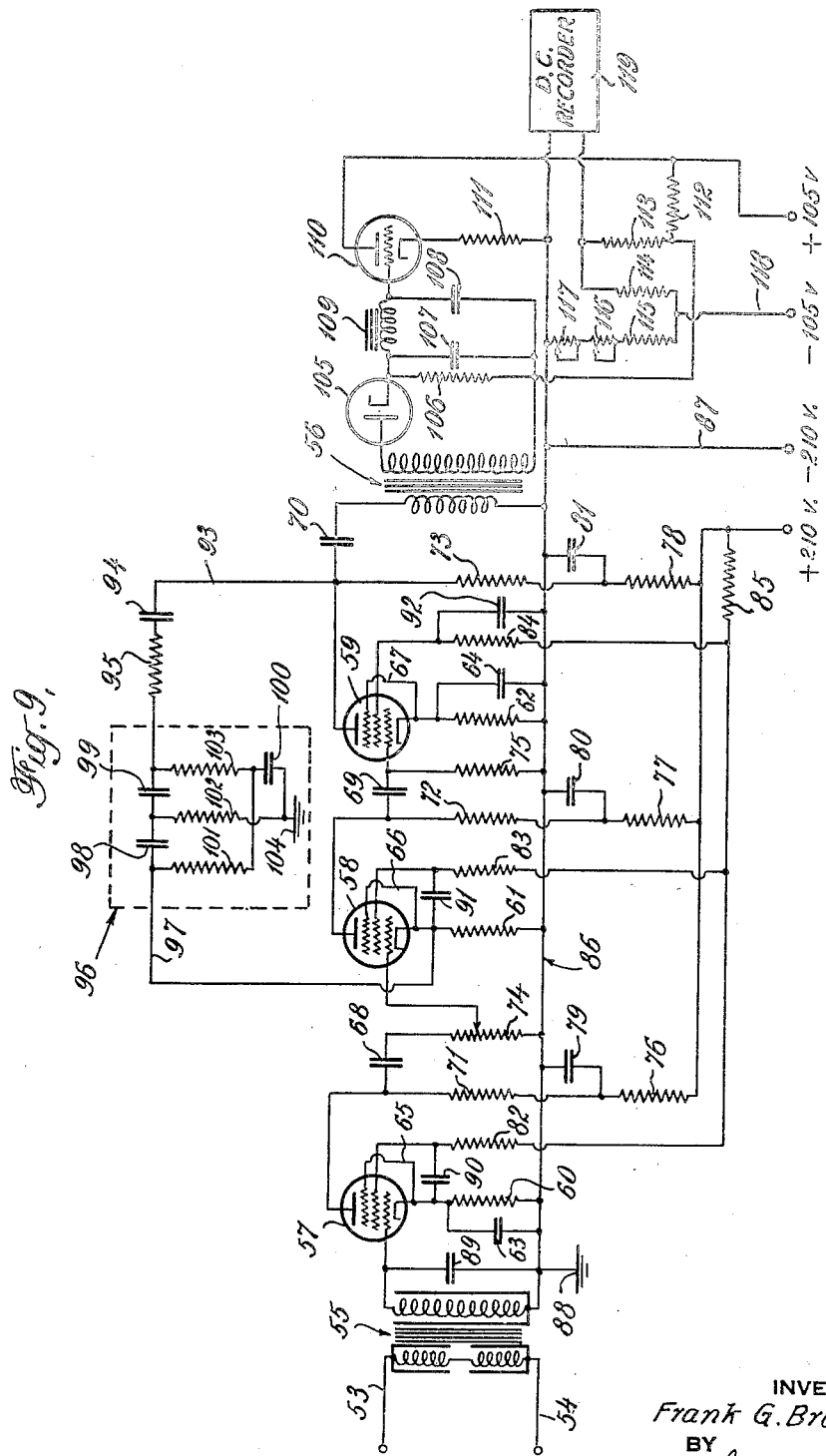

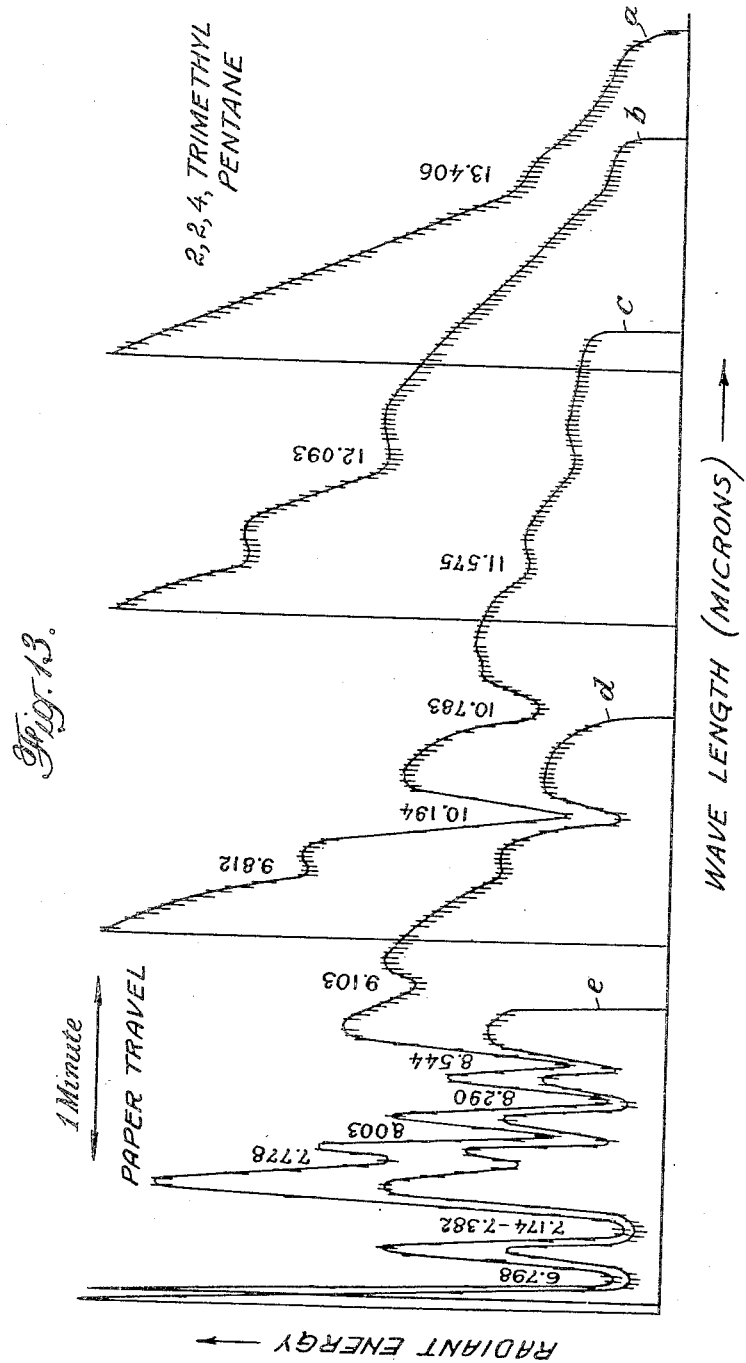

Patented July 25, 1950

UNITED STATES PATENT OFFICE 2,516,672

APPARATUS FOR MEASURING RADIANT ENERGY

Frank G. Brockman, Dobbs Ferry, N. Y., assignor to Socony-Vacuum Oil Company, Incorporated, a corporation of New York Application May 27, 1944, Serial No. 537,652

3 Claims. (Cl. 201—63)

This invention relates generally to an instrument for measuring extremely small amounts of radiant energy and more particularly for measuring the small amount of radiant energy available at the exit slit of infrared spectrographs that are adapted for use in obtaining information as to the composition of a chemical substance from its ability to absorb radiations of particular wave lengths and transmit others.

A particular application of this invention is to the identification of hydrocarbons. In order to investigate a sample of hydrocarbons the sample is subjected to radiations from an infrared ray source and a record is made of the dispersed radiations transmitted by the sample by measuring the radiant energy imparted to one element of an electrical circuit.

The element to which radiant energy is imparted is connected in one arm of a bridge circuit in such a manner that a change in the temperature of the element will produce a change in the resistance of the element and thereby unbalance the bridge circuit. The bridge circuit is supplied with a source of power in the form of an alternating carrier current. The current flowing in the bridge circuit, when unbalanced, modulates the carrier and this modulated carrier is amplified, rectified and the resultant signal is recorded on a moving recorder strip whose movement may be, but not necessarily, coordinated with the scanning means. A record made in this manner will be a curve that has been drawn with transmitted energy as ordinates and wave length of radiations as abscissa. Substances can be identified by observing on the curve the wave lengths of radiations that are absorbed by that sample.

It is to be understood that this invention is not limited to the identification of mixtures of hydrocarbons by infrared radiation but had broad application in that it can be practiced in the investigation of other substances by the use of infrared or other radiations, as well as application in the detection and measurement of any form of radiant energy.

Therefore, the principal object of this invention is to provide an instrument that is extremely sensitive to radiant energy by means of which a sample of a substance can be rapidly scanned with a selected portion of the spectrum of radiations and a record made of the sample's transmission qualities.

The customary device for the detection of small amounts of radiant energy, for instance, in infrared spectroscopy, is an extremely small thermocouple, or thermopile, operating a galvanometer. This system of detection has been highly developed and has numerous variants. It is, however, subject to one or both of two difficulties, namely, those inherent in the use of high sensitivity galvanometers and the effects due to spurious electromotive forces generated by slight temperature differences at the various circuit junctions.

Bridge type instruments, known as bolometers, differ in principle from the thermocouple. The bolometer is in fact a resistance thermometer in which the radiant energy detector is an extremely small conductor of electricity which forms one arm of a Wheatstone bridge. For convenience the extremely small conductor will be referred to as a "bolometer ribbon."

The bolometer, as a detector of small amounts of radiant energy, has been known since 1881 when S. P. Langley devised and operated one at the Smithsonian Institute (Proceedings of the American Academy of Arts and Sciences, 16, 342–1881). Since the Wheatstone bridge of Langley's bolometer operated on direct current it was subject to two difficulties which will be pointed out below.

In Langley's work the bolometer bridge was made with two bolometer ribbons as nearly identical as he could make them. These were placed in the bridge as adjacent arms. Of the two, only one was exposed to the radiant energy. The purpose of this arrangement was to make the bridge self compensating for fluctuations in ambient temperature.

The present invention also utilizes two bolometer ribbons, but experiments made while developing the present invention proved that the two ribbons cannot be made sufficiently alike in temperature coefficient of resistivity to compensate for even relatively small temperature changes. In addition it has been found that if the input voltage to the bridge is not constant to a very high degree, instability of the device is considerable. This latter effect also is due to the inability to make the two bolometer ribbons identical.

The temperatures of the two ribbons are dependent upon the heat generated in them by the current flowing through them as well as upon the ambient temperature. If the two ribbons are not identical in resistance, a change in input voltage, which causes a change in current through the ribbons, will produce a greater effect upon the higher resistance ribbon than upon the lower resistance ribbon if the same current flows through each. This is because the power dissipated as heat, W, is represented by $$W = I^2 R$$

where I is the current in the ribbon and R is its resistance. For a small change in I the change in the power dissipated as heat is $$\Delta W = 2IR\Delta I \text{ (approximately)}$$

So that, for the same increment of current, the increment of power is greater if R is greater.

In the present invention these two sources of instability have been eliminated by using in conjunction with the ribbons, other properly adjusted resistors of zero temperature coefficient.

Parry Moon, in his article in Journal Franklin Institute 219, 17 (1935) and Moon and Mills, in their article in Review of Scientific Instruments 6, 8 (1935) appreciated the objectionable difficulties involved in the use of Langley's bolometer and described a bolometer that could be utilized so as to eliminate, in part, these difficulties. The improvement in operations came about when alternating current energy instead of direct current energy was fed to the Wheatstone bridge. As can be seen by reference to the above articles, Moon and Mills did not disclose a device that is applicable to the detection of small amounts of energy such as those encountered in infrared spectroscopy.

Therefore, it is a further object of this invention to provide a carrier wave operated bolometer which is free of the above described difficulties and which is adapted to detect extremely small amounts of radiant energy such as those encountered in infrared spectroscopy.

Another object of this invention resides in the provision of means of compensating for the inequality of the temperature coefficient of the bolometer ribbons.

Still another object is to provide a bolometer bridge that is relatively insensitive to the fluctuations in the carrier wave voltage.

This invention further contemplates an apparatus whereby samples of compositions can be tested by locating the regions of spectral absorption over a wide range and making a record thereof.

Other objects and advantages of this invention will become apparent from the following detailed description when taken with the drawings, in which Figure 1 is a diagrammatic illustration of the optical system and housing therefor showing the manner in which the radiation from a source passes through a sample is doubly refracted, and reflected onto the bolometer ribbon;

Figure 2 is a front view of a bolometer ribbon mounting frame;

Figure 3 is a side view of the bolometer ribbon frame;

Figure 4 is a wiring diagram of the bolometer bridge circuit;

Figure 5 is a diagrammatic illustration of the electrical apparatus of the spectograph;

Figure 6 shows two curves which illustrate two factors involved in voltage compensation for the bridge;

Figure 7 shows diagrammatically a direct current power supply, a vacuum tube driven fork, and a degenerative amplifier and the electrical connections between them;

Figure 8 is a circuit diagram of a degenerative power amplifier for increasing the carrier wave current before it is applied to the bridge;

Figure 9 is a circuit diagram of a critically tuned amplifier having its output connected through a rectifier and direct current amplifier to a recorder;

Figure 13 illustrates a record of spectral absorption of a sample of 2,2,4-trimethyl pentane over a wave length range of from approximately 6.5 to 13.5 microns.

Figure 10:
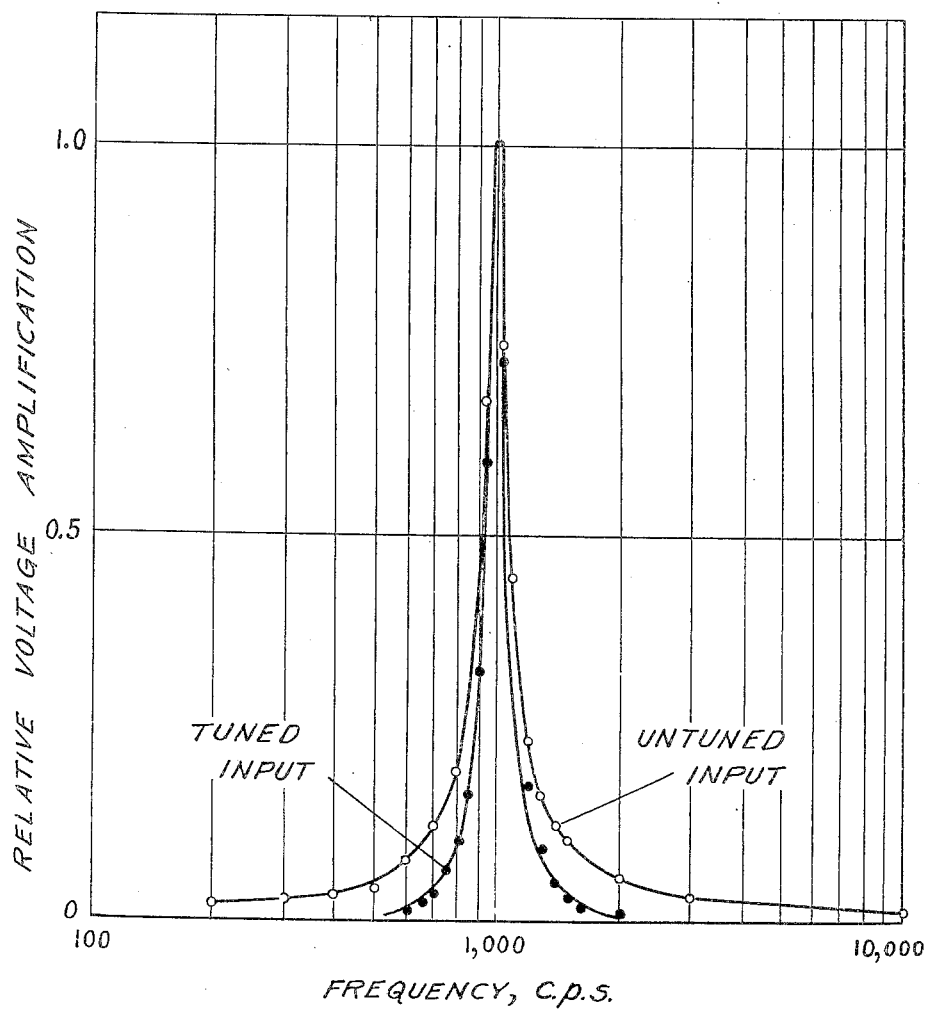
Figure 10 illustrates the resonance curves of the amplifier.

Although this invention has broad application it will be specifically described as applied to the identification of hydrocarbons by the determination of their spectral absorption while using a band of infrared radiation as a source.

Referring to Figure 1, the air-tight housing 10 is provided with a rock salt window 11 through which infrared radiation passes from an external source 12 such as a Nernst lamp, "globar," or other source whose continuous radiation is comparable to "blackbody" radiation. A sample 13 of the hydrocarbon that is to be tested is confined in a container having rock salt walls. The container is disposed inside or outside of the housing 10 adjacent the window 11 and in the path of the radiation from source 12. The radiation transmitted through a slit strikes the concave mirror 14 from which it is reflected to a face of a rock salt prism 15. The radiation in traversing the prism is dispersed and strikes the face of a mirror 16. The mirror 16 reflects the radiation back through the prism 15 onto the concave reflector 14. The return radiation from reflector 14 strikes another reflector 17 from which it passes through a slit in housing 10 into the bolometer ribbon housing 18. The radiation entering housing 18 strikes a concave reflector 19 which serves to focus the reflected radiation on the detector 20.

Since a record is to be made of the spectral absorption of the sample, means are provided for gradually and continuously rotating mirror 16 so that the effect of the sample on all wave lengths of the radiation can be recorded.

Although a record from 2 to 14 microns wave length can be obtained, the region usually studied in the investigation of hydrocarbons is from approximately 7 to 14 microns. By connecting the drive for mirror 16 to that of the recorder strip the record will be a curve that is drawn with wave length as abscissa and transmitted energy as ordinates. However, when indications of wave length are automatically placed on the curve as it is drawn, it is not necessary to connect the recorder strip drive to the mirror drive.

The detector 20 for the transmitted radiation is a metallic ribbon, or filament, which is connected in one arm of a Wheatstone bridge circuit. This metallic ribbon, or filament, is of the type described in a copending application by Frank G. Brockman and John W. Wescott 2nd, Serial Number 530,950, filed April 13, 1944, now Patent No. 2,469,947, issued May 10, 1949.

As is customary in direct current bolometer systems, the bolometer is constructed with two filaments as nearly identical as possible so that, when incorporated into adjacent arms of the bridge circuit, the ratio of the resistances of these two filaments will remain constant regardless of ambient temperature changes and changes in bridge current. The detection of radiant energy is effected by allowing the radiation to fall upon only one of the two filaments, thereby changing this ratio. If the effects of ambient temperature changes and current changes are not eliminated the result is instability, manifested as fluctuations and drift.

Referring to Figures 2 and 3, the filaments 21 and 22 are mounted on a frame 23 that is designed to fit into a brass case 24 which is supplied with a rock salt window 25 adjacent the filament 21. The frame 23 comprises three parallel platinum wires 26, 27 and 28. These wires are secured in spaced relationship by glass beads 29 and 30 and the bottom ends of all three of them are brought out through the glass plug 31 which forms a closure for the brass case 24. Wire 26 extends the full length of the frame and has its upper end bent back through bead 30 and flattened to provide a supporting and contact surface 32 for the upper end of filament 22. Wire 28 also extends the full length of the frame and terminates in the glass bead 30. This wire is provided at a point equally spaced from the ends of the flattened surfaces of wires 26 and 27 with an arm 33 which extends inwardly and has a flattened surface 34 which is in alignment with the flattened surface 32 on the end of wire 26. Surface 34 forms a support and contact for the bottom end of filament 22 and for the top end of filament 21. Wire 27 only extends through the plug 31 and glass bead 29 and has its upper end flattened to form a supporting and contact surface for the bottom end of filament 21.

It is apparent that the filaments 21 and 22 can be formed by a single ribbon by connecting its ends respectively to the flattened surfaces at the ends of conductors 26 and 27 and by connecting the midpoint to the flattened surface formed on the end of arm 33. In practice this method is preferred.

The above described frame and filaments are adapted to be inserted in the brass case 24 and sealed off. It is preferable to partially or completely evacuate the case before sealing, however, it is not essential since compensation is made for changes in temperature.

As described above the brass case 24 is provided with a rock salt window so that one of the filaments can be exposed to infrared radiations. The other filament is thus shielded from the infrared radiations and is only exposed to the heat of the medium surrounding it.

The two filaments 21 and 22 of the bolometer are connected in two adjacent arms of an alternating current Wheatstone bridge circuit as resistances $R_L$ and $R_H$, respectively, as shown in Figure 4. The principal resistances in the other two arms are $R_1$ and $R_2$. $R_3$ is inserted in series with $R_2$ in one arm to facilitate balancing. Its function will be described below. The variable condenser C and the variable resistance box $R_B$ may be connected in parallel with the arm comprising resistances $R_2$ and $R_3$. These elements are also used to balance the bridge. It may be necessary to connect condenser C across some other arm of the bridge, for instance, across the arm comprising resistances $R_L$ and $R_T$, depending upon the distributed capacitative unbalance which exists.

The bolometer bridge is connected into the electrical recording system as shown in Figure 5. Since the bridge is powered by alternating current the power leads, output leads, and all elements of the bridge circuit are shielded as shown in Figure 4.

The expedient of the bolometer pair has achieved only a first order compensation since it has not been possible to construct two filaments of identical resistance. Additional compensation has been obtained by incorporating the non-inductive manganin resistances $R_V$ and $R_T$. Resistance $R_V$ is connected in parallel with the filament resistance $R_H$, the filament of highest resistance, and the resistance $R_T$ is connected in series with the filament resistance $R_L$, the filament of lowest resistance. Their function will be hereinafter described.

The bridge is supplied with power by a carrier current wave of, for example, 1000 cycles frequency through the conductors 35 and 36 at a controlled voltage. The juncture of the bridge circuit and conductor 36 is connected to ground at 36'. Fluctuations in the voltage supplied to the bridge through the conductors 35 and 36, and therefore in the current through the filaments $R_H$ and $R_L$, are compensated, at any one current, by the resistance $R_V$. The value of this resistor was determined experimentally as the one which gave the minimum unbalance of an initially balanced bridge upon the application of a small increment in bridge supply voltage. The resistance $R_T$ is necessary to further compensate the bridge for ambient temperatures. This value of resistance was calculated to provide the arm $R_L+R_T$ with a temperature coefficient of resistivity equal to the coefficient of the parallel combination of $R_V$ and $R_H$. The resistor $R_3$ was inserted so that bridge balance could be achieved with about 5000 ohms in resistance $R_B$. At this value $R_B$, an 11,111.1 ohm resistance box, has sufficient range to yield perfect balance and the switch contact resistance is negligible compared with 5000 ohms.

Two factors are involved in the voltage compensation when the bolometer enclosure is sealed off at atmospheric pressure. If the voltage applied to the bridge is changed and the bridge is rebalanced, after equilibrium has set in, the curve marked "Equilibrium" in Figure 6 is obtained when the bridge voltage is plotted against the balancing resistance $R_B$. If, on the other hand, the bridge is set in balance at any one voltage and the voltage is quickly altered by some small percentage, a practically instantaneous deflection of the balance indicator may occur which will be followed by the slower drift to the equilibrium position. The magnitude of this instantaneous deflection in arbitrary scale units was determined for the bridge in equilibrium at various input voltages, using a constant and small percentage change, about 5 percent, in the input voltage. The results of these tests are shown by the curve marked "Instantaneous" in Figure 6. It is to be noted that the deflections change sign and go through zero. Therefore, one has two choices of operation: the first at about 1.45 volts R. M. S. input, at which slow drifts in the power supply are compensated and the second at about 1.61 volts R. M. S. at which rapid fluctuations of the power supply are compensated.

The above behaviour, as pointed out in the beginning of the preceding paragraph, was observed with the bolometer sealed off in air at atmospheric pressure. The above variation can be in part or completely eliminated by evacuating the bolometer enclosure. This will have the effect of bringing the two operating points together, or nearly so, resulting in a major improvement in the operation.

As pointed out in the description of the bolometer bridge, the balance of the bridge is very sensitive to variations in the input voltage. Although the bridge has been compensated for such variations, the compensation is not complete under all conditions and the other expedient of maintaining the input voltage constant is also practiced.

The power for the bridge circuit is supplied by a vacuum-tube driven fork of the type similar to that known commercially as a General Radio Company Type 723-A, differing, however, in that the battery supply has been replaced by power from a high stability regulated direct current power supply. This power supply is similar to that described by S. N. Miller in Electronics 14, 27 (November 1941). For purposes of explanation reference will be made to this power supply as having a frequency of 1000 cycles. This value has been found to be practical but may be changed to any desired frequency.

The 1000 cycle power available from the vacuum-tube fork is not sufficient to supply the bolometer bridge, so that a highly degenerative power amplifier is used to amplify the output of the fork. Figure 7 shows diagrammatically the direct current power supply, the vacuum-tube driven fork, and the degenerative power amplifier and the electrical connections between them. Heater and plate power for the degenerative amplifier are taken from the regulated direct current power supply used to supply the fork.

The degenerative power amplifier, the detailed circuit diagram of which is shown in Figure 8, has its input connected through conductors 37 and 38 and the variable resistance 39 to the output of the vacuum-tube driven fork as shown in Figure 7. Input leads 37 and 38 are connected across the primary of an autotransformer 40. The secondary of transformer 40 is provided with a center tap at 41. Sections 42 and 43 of the secondary are connected in the grid circuits of amplifier tubes 44 and 45, respectively. The grid-cathode circuit of tube 44 then comprises section 42 of the secondary of transformer 40, conductor 46, one half of the tapped primary winding of transformer 47, and a self biasing resistance-capacity combination made up of resistance 48 connected in parallel with by-pass condenser 49. Tube 45 which is connected in a bridge circuit with tube 44 has its grid-cathode circuit made up of section 43 of the secondary of transformer 40, conductor 46, the bottom section of the primary winding of transformer 47 and the self biasing resistance-capacity combination made up of resistance 50 and by-pass condenser 51. The plates of the two tubes are connected together and the plate-cathode circuit is completed through the 240 volt power supply and the conductor 52. Amplified plate current flowing in the plate circuits of the two tubes and the primary winding of transformer 47 induces a voltage in the secondary winding. Since transformer 47 is a step-down type with a tapped secondary the induced secondary voltage and current desired can be selected. The output of the degenerative amplifier is impressed across the bolometer bridge by means of conductors 35 and 36 and functions as a carrier wave therefor.

The 1000 cycle carrier current that is impressed on the bridge is modulated by the unbalanced bridge current which is produced by the variation in resistance ratio between the two bolometer filaments due to the exposure of one of the filaments to varying infrared radiation.

The output of the bolometer bridge, which is the 1000 cycle carrier modulated by the unbalanced bridge, is conducted to the input of an alternating voltage amplifier through the conductors 53 and 54.

The voltage output from the bolometer bridge approaches the lower limit of present-day voltage measurement methods, since the quantity of radiant energy appearing at the exit slit of a spectograph and incident on the bolometer filament is very small.

The measurement of small alternating voltages is at a much higher stage of development than the measurement of small direct voltages. Herein lies one of the most important advantages of the alternating current bolometer.

A detailed circuit diagram of the amplifier, rectifier and direct current amplifier is shown in Figure 9.

The alternating voltage amplifier constructed for this application has a full scale sensitivity of 0.13 microvolt when operated into a high speed recorder with a 15 ohm resistance and a full scale of 7.5 millivolts. The amplifier is sharply tuned to the frequency of resonance of the voltage supply to the bridge, in the example used, 1000 cycles. The resonance curves of the amplifier both with and without the tuned input transformer are given in Figure 10.

The three-stage alternating voltage amplifier is resistance coupled and is provided with an input transformer 55 and an output transformer 56. The amplifier tubes 57, 58 and 59 are pentodes such as type number 1221. The respective cathodes of the tubes are provided with self-biasing resistances 60, 61 and 62. Resistances 60 and 62 are by-passed by condensers 63 and 64, respectively, to prevent a reduction in the signal. The suppressor grids are connected to the cathodes of their respective tubes by conductors 65, 66 and 67, respectively. Condensers 68, 69 and 70 are conventional coupling condensers and resistances 71, 72 and 73 are coupling resistances. Resistances 74 and 75 are grid resistances. Grid resistance 74 is a potentiometer which serves as a gain control. Resistances 76, 77 and 78 are respectively connected in each of the plate potential supply leads and function respectively with the condensers 79, 80 and 81 to form filters which isolate the plate potential supplies. The screen grid potential circuits of the tubes are respectively provided with voltage dropping resistances 82, 83 and 84. The screen grid potential for each tube is supplied through resistance 85 from a source common to the plate potential supply. The negative side of the plate potential supply is connected to conductor 86 through conductor 87. Conductor 86 is connected to ground at 88. The heaters for the three tubes are supplied with 60 cycle current at 6.3 volts.

The secondary of transformer 55 and condenser 89 constitute a resonant circuit that is critically tuned to resonance at the frequency of the power supplied to the bolometer bridge. Condensers 90 and 91 are respectively connected between the screen grid and cathode of tubes 57 and 58 to by-pass resistances 82 and 83, respectively, to prevent undesirable feed-back through the screen potential supply and provide stability to the amplifier. Condenser 92 by-passes resistance 84 to isolate the D. C. screen potential supply.

In order to critically tune the amplifier to the frequency of the bolometer bridge power supply advantage is taken of inverse feed-back. The feed-back circuit includes conductor 93, condenser 94, resistance 95, the bridged T network 96, and conductor 97. Condenser 94 blocks the plate potential supply for tube 59 from the cathode of tube 58; the resistance 95 keeps the amplifier gain up by reducing the negative feedback; and the bridged T network 96 which includes condensers 98, 99 and 100, resistances 101, 102 and 103, and the ground connection at 104, attenuates all signals having the frequency of the bolometer bridge power supply. Therefore, the signals fed back will substantially cancel all signals of frequencies other than that of the carrier wave.

Figure 12:
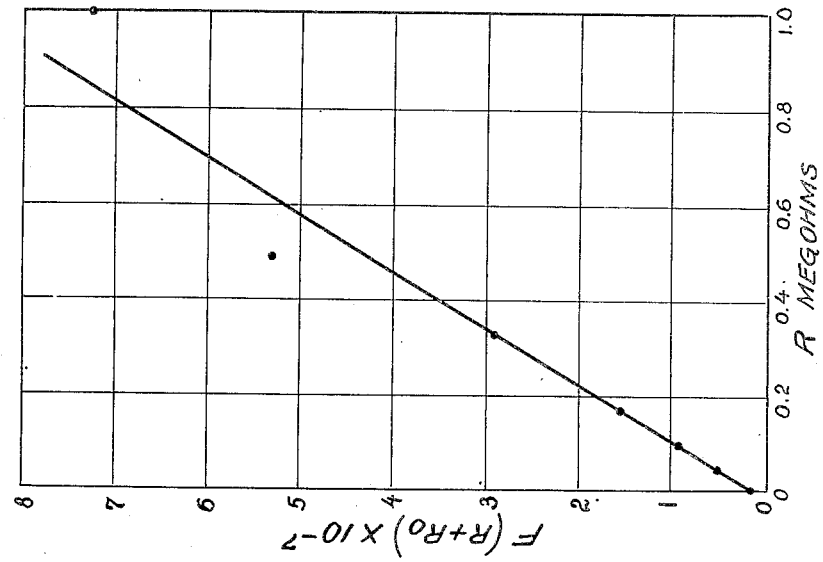
Figure 12 is a curve that represents the noise characteristic of the A. C. amplifier.

The amplifier described above is substantially free of objectionable noises which would limit its upper gain threshold. The noise in the amplifier has been studied by disconnecting the input transformer and connecting the grid of the first stage to ground through various resistances. Knowing the R. M. S. voltage sensitivity of the amplifier, the noise voltage was determined for these resistances. The practical thermal noise voltage equation for room temperature, $$\overline{V_T^2} = 1.64 \times 10^{-20}(R - R_0)F$$

can be used with data obtained in this manner by plotting $$\overline{V_T^2}/1.64 \times 10^{-20}$$

against R, where $$\overline{V_T^2}$$

is the mean square thermal noise voltage, $R_0$ is the equivalent input resistance for the noise originating in the first tube. R is the resistance introduced into the grid circuit, F is the band width in cycles per second for ½ voltage gain at resonance. This is shown by the graph in Figure 12. The slope of the straight line is equal to F and is found to be 84 cycles per second, which agrees well with the band width of this portion of the amplifier as determined from Figure 10. The equivalent noise resistance of the first tube, 14,000 ohms, is obtained from the intercept which is $R_0F$. With a 30:1 step-up ratio input transformer and an input resistive source of 25 ohms, the equivalent source resistance on the grid of the first tube is 22,500 ohms, so that if the amplifier can be utilized at full gain the limit is not the noise of the first tube but the thermal noise of the source.

In addition to the advantage in thermal noise reduction, a tuned amplifier is necessary to discriminate against the harmonics of the fundamental carrier wave frequency. The bolometers are harmonic generators since their time constant is of the same order of magnitude as that of the period of the bridge power frequency.

The output of the amplifier can be fed directly into an alternating current recorder and recorded on a moving recorder strip whose movement may or may not be synchronized with the movement of the scanning means.

However, since no alternating current recorders are available the amplified modulated carrier current must be rectified to supply a direct current recorder. The output rectifier is followed by a degenerative direct current amplifier to match the high output resistance of the rectifier to the low input resistance of the direct current recorder.

The rectifier includes one or more rectifier tubes 105, which may be of the 6H6 type, resistance 106, condensers 107 and 108, and the choke 109. The condensers and the choke form a low-pass π- section filter for smoothing out the pulses produced by the rectifier tube and rapid fluctuations which originate in the power supply to the bridge. If more than one rectifier tube is used they can be connected in parallel.

The direct current amplifier and recorder input circuits include the amplifier tube 110 which may be of the 6J5 type, cathode resistance 111, voltage divider resistances 112, 113 and 114, and resistances 115, 116 and 117. Resistance 113 together with resistances 112 and 114 serves to develop the correct negative bias for the direct current amplifier tube. Resistances 115, 116 and 117 serve to return the voltage drop across resistance 114 through the recorder in opposition to the normal plate current of tube 110 which flows with no voltage input to the amplifier. By the variable resistances 116 and 117 this plate current can be equalized so that the recorder can be set to zero, or any other point on its scale, with no input voltage to the amplifier terminals 53 and 54.

In recording the unbalance of the bolometer bridge, two choices of method exist: The recorder may indicate the magnitude of the unbalance voltage or the recorder may be so constructed that the bridge is maintained in balance and the recorder would then indicate the resistance change necessary to maintain balance. The former has been illustrated and described herein because such a recorder is an article of commerce, whereas the latter recorder would be a special item.

Figure 11:
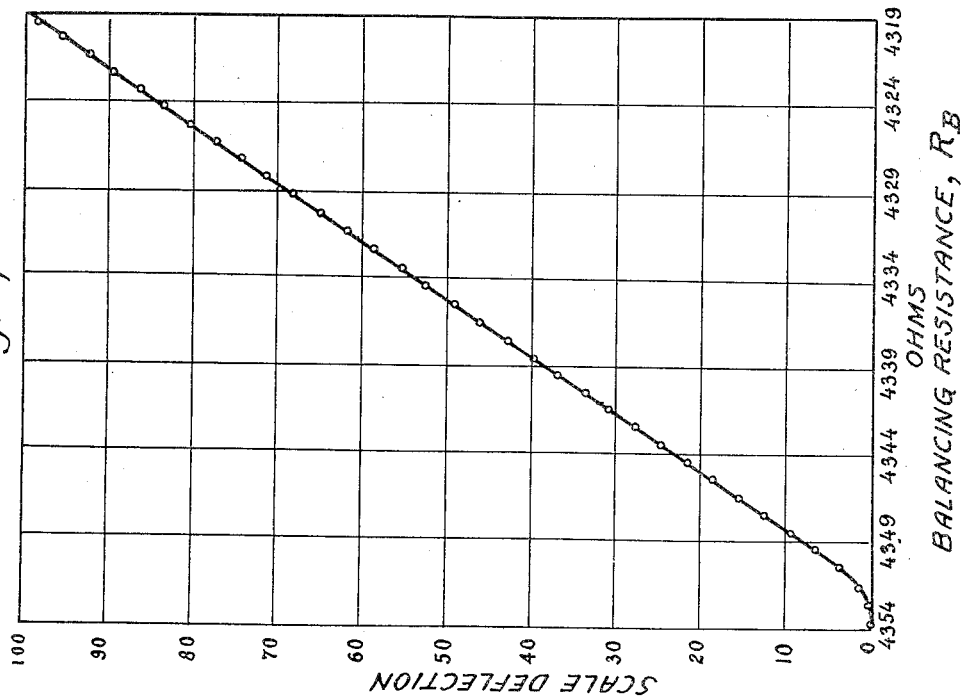
Figure 11 is a curve which illustrates the linearity of the bridge, amplifier and recorder.

The operation of any bolometer system is based on the principle that the resistance change of the bolometer filament is directly proportional to the amount of radiant energy which it receives. That the amplifier-rectifier-recorder is linear in resistive unbalance of the bridge is illustrated by the curve in Figure 11 which was obtained when the bridge was placed out of balance by the resistance $R_B$ in Figure 4. The following data pertains to Figure 11. The resistance $R_B$ shunts $R_2 + R_3$ (26.43 ohms). Over the range $R_B = 4354$ to 5319 ohms the parallel combination is linear in $R_B$ to better than 1 part in $10^6$, and a 5 ohm change in $R_B$ corresponds to a .00018 ohm change in the parallel combination. At, for instance, 4339 ohms for $R_B$, the nominal resistance of the parallel combination is 26.26998 ohms. The scale is linear except for about 4% of the scale at the zero end. This non-linearity is eliminated by placing the bridge out of balance by $R_B$ by about 8% without radiant energy upon the bolometer. Subsequent unbalance produced by radiation upon the bolometer is then recorded as deflection about this "zero."

The response time of the system is limited by the response time of the amplifier-rectifier unit. This is so because of the filter network between the rectifier and the direct current amplifier. This filter, however, is necessary to smooth out rapid fluctuations which originate in the power supply to the bridge. The response time of the overall system is about 0.8 second to attain $e^{-1}$ times the full deflection. Therefore, by preventing fluctuations in the bridge power supply the response time can be greatly diminished and the sensitivity greatly increased.

A permanent record of the spectrum from 2 to 14 microns wave length can be obtained in 40 minutes with the above described filter in the circuit, without recourse to a photographic procedure in recording. The region from 7 to 14 microns wave length, usually studied in hydrocarbon mixtures is recorded in 24 minutes. These times include partial rescanning at different amplifier gain settings and at slit width changes.

Figure 13 is a reproduction of a recorded spectrum showing the spectral absorption bands of 2,2,4-trimethyl pentane. The short lines superimposed are wave length reference marks. The rate of recorder strip speed is marked on the record. This curve has been recorded from right to left in five overlapping sections. Due to the spectral energy distribution in the source radiation this was necessary so that the entire spectrum could be drawn on a recorder strip of selected width. Section $a$ was recorded while using highest useable gain and sections $b$, $c$, $d$ and $e$ were recorded while using a constant reduced gain. Section $b$ was recorded with the same slit opening as used in recording section $a$, but sections $c$, $d$ and $e$ were recorded with successive decreases in slit opening.

I claim:

1. A bolometer comprising in combination a sealed housing, a metallic filament having uniform physical properties including cross-sectional area and electrical resistance and a substantial temperature coefficient of resistance in said housing, a pair of electrical conductors extending from a point outside the housing into the housing and forming electrical contacts with and supports for the respective ends of the filament, a third electrical conductor extending from a point outside the housing into the housing and forming electrical contact with and a support for the center of said filament, said housing shielding one section of said filament from radiation and having a window adjacent one section of said filament, whereby only one section of the filament can be subjected to radiant energy.

2. A bolometer comprising in combination a sealed housing, a metallic filament having uniform physical properties including cross-sectional area and electrical resistance and a substantial temperature coefficient of resistance in said housing, a pair of electrical conductors extending from a point outside the housing into the housing and forming electrical contacts with and supports for the respective ends of the filament, a third electrical conductor extending from a point outside the housing into the housing and forming electrical contact with the filament at a point intermediate the ends thereof, said housing shielding one section of said filament from radiation and having a window adjacent the other section of said filament whereby only one section of the filament can be subjected to radiant energy.

3. A bolometer comprising in combination a sealed housing, a metallic filament having uniform physical properties including cross-sectional area and electrical resistance and a substantial temperature coefficient of resistance in said housing, a pair of electrical conductors extending from a point outside the housing into the housing and forming electrical contacts with and supports for the respective ends of the filament, a third electrical conductor extending from a point outside the housing into the housing and forming electrical contact with the filament at a point intermediate the ends thereof thus dividing the filament into two sections, said housing having a window adjacent one of the sections of the filament whereby the filament adjacent the window can be subjected to radiant energy.

FRANK G. BROCKMAN.

REFERENCES CITED

The following references are of record in the file of this patent:

UNITED STATES PATENTS

| Number | Name | Date |
| --- | --- | --- |
| 1,099,199 | Parker | June 9, 1914 |
| 1,426,861 | Haddock | Aug. 22, 1922 |
| 1,506,003 | Kambayashi | Aug. 26, 1924 |
| 1,639,412 | Mechau | Aug. 16, 1927 |
| 1,994,232 | Schuck, Jr. | Mar. 12, 1935 |
| 2,025,158 | Cowan | Dec. 24, 1935 |
| 2,078,974 | Riesz | May 4, 1937 |
| 2,081,367 | Nicolson | May 25, 1937 |
| 2,125,113 | Kling | July 26, 1938 |
| 2,170,435 | Sweeney | Aug. 22, 1939 |
| 2,176,013 | Pineo | Oct. 10, 1939 |
| 2,205,306 | Olshevsky | June 18, 1940 |
| 2,314,800 | Pineo | Mar. 20, 1943 |
| 2,364,483 | Side | Dec. 5, 1944 |
| 2,385,481 | Wills | Sept. 25, 1945 |
| 2,386,831 | Wright | Oct. 16, 1945 |
| 2,388,105 | Wilson | Oct. 30, 1945 |
| 2,432,199 | Kamm | Dec. 9, 1947 |
| 2,437,449 | Ames, Jr., et al. | Mar. 9, 1948 |